March 27, 1962 H. B. PETTEE 3,026,948
EARTH BORING APPARATUS
Filed Sept. 8, 1959 2 Sheets-Sheet 1
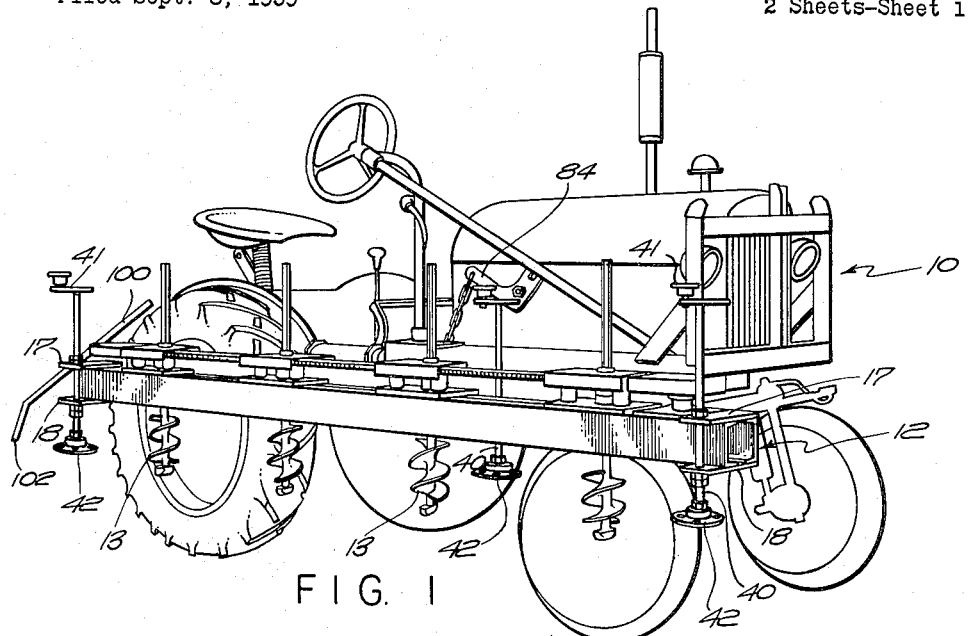
FIG. 1
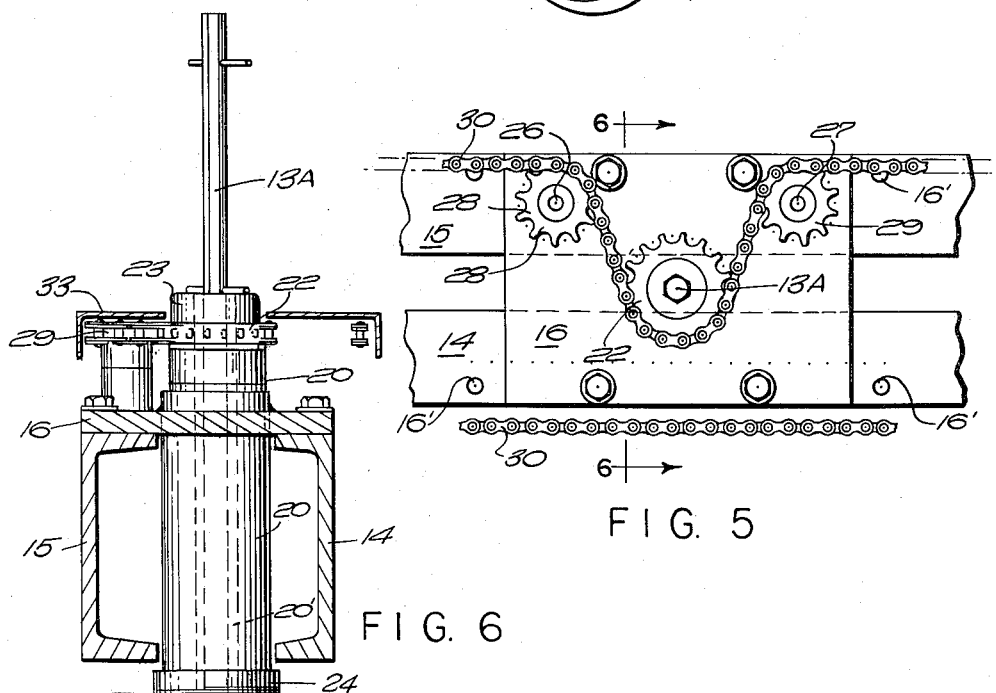
FIG. 5
FIG. 6
INVENTOR.
HERBERT B. PETTEE
BY
Barlow & Barlow
ATTORNEYS March 27, 1962 H. B. PETTEE 3,026,948
EARTH BORING APPARATUS
Filed Sept. 8, 1959 2 Sheets-Sheet 2
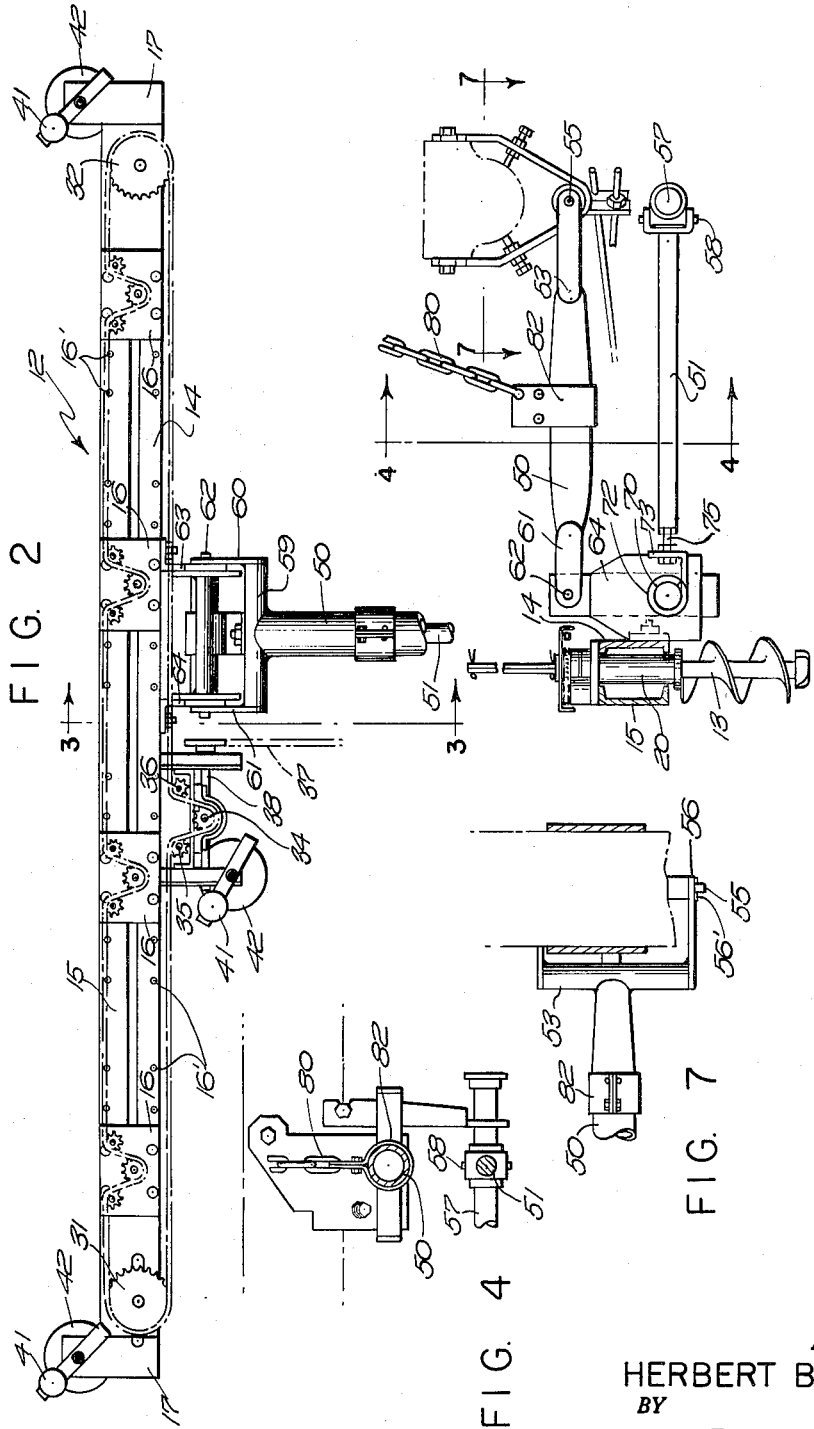
INVENTOR.
HERBERT B. PETTEE
BY
Barlow + Barlow
ATTORNEYS United States Patent Office 3,026,948
Patented Mar. 27, 1962

3,026,948
EARTH BORING APPARATUS
Herbert B. Pettee, Allenton Road, R.F.D. 1,
Hamilton, R.I.
Filed Sept. 8, 1959, Ser. No. 838,741
4 Claims. (Cl. 175—108)

The present invention relates to an improvment in earth boring apparatus and particularly the provision of an apparatus which will enable the owner of a nursery to plant seedlings in a minimum amount of time. The apparatus of course is adapted for uses, where an accurate spacing of holes is desired.

Heretofore it has been customary to utilize an earth boring apparatus which would have a single auger bit affixed thereto. This apparatus would either be attached to a tractor of the two-wheeled variety or might conceivably be a larger apparatus attached to a four-wheel tractor. In the latter case the apparatus usually was of a fairly complicated nature requiring certain positioning controls to maintain a vertical attitude of the auger bit. It can be readily recognized that an automatic control of the vertical attitude of the auger bit is most desirable, for if a manual control is used, it slows down the operation of the digging as the operator must be constantly attendant to the attitude of the bit. The instant invention overcomes most of these prior disadvantages and further adapts itself very well to nursery seedling planting, which in the past has usually been done by dibble planting which utilizes a type of shovel and plow planting where a moldboard plow is used to turn a furrow that is subsequently filled in over the individual plants, and the use of the machine described in this application will provide a number of equally spaced holes in which the dirt has been substantially removed and deposited about the rim thereof and will enable one to plant at a rather rapid rate of speed, as a man will only be able to place a seedling in a hole about as fast as the tractor moves along the row.

It is therefore the main object of this invention to provide a boring apparatus which may be readily mounted on a vehicle such as a tractor and which will be driven by the main engine of the tractor and raised and lowered in a vertical attitude relative thereto.

Another object of the invention is the provision of a relatively lightweight and simple mechanism for driving a plurality of auger bits which can be raised and lowered by the mechanism attached to the tractor initially.

A still further object of the invention is an improved method of mounting the auger bit support means whereby the auger bit will be automatically maintained in a vertical attitude regardless of its vertical position.

A still further object of the invention is to provide an apparatus with a plurality of auger bits which will all operate together and place a number of holes equally spaced apart.

Another object of the invention is to enable an adjustment for the variation of spacing between a group of holes.

With these and other objects in view, the invention consists of certain novel features of construction as will be more fully described and particularly pointed out in the appended claims.

In the drawings:

FIGURE 1 is a perspective view of a tractor with the mechanism of the invention attached thereto;

FIGURE 2 is a top plan view of the frame in which the individual auger bits are mounted and with the top guards removed;

FIGURE 3 is a sectional view taken on lines 3—3 of FIG. 2;

FIG. 4 is a sectional view taken on lines 4—4 of FIG. 3;

FIGURE 5 is a partial plan view on an enlarged scale of the method by which the individual auger bits are driven;

FIGURE 6 is a sectional view taken on lines 6—6 of FIG. 5; and

FIGURE 7 is a sectional view taken on lines 7—7 of FIG. 3.

Referring to the drawings, 10 designates generally an ordinary commercial tractor of a well-known type which is provided with a power take-off and a hydraulic lifting mechanism as standard equipment. Secured to the right-hand side of the tractor is an auger bit support frame generally designated 12 which has a plurality of auger bits 13 rotatively held therein. The frame 12 has a general box-like construction which is formed by a pair of channel iron longitudinal members 14 and 15 that are held in spaced relationship by end plates 17 and 18 secured to the top and bottom of the channels 14 and 15 at each end thereof, thus completing the basic structure. Holes 16' are provided along the length of the members 14, 15 so that plates 16 may be secured at various locations to position them a desired interval apart, which interval may be changed from time to time as occasion may require.

Secured to each of the plates 16, is a bearing 20 which bearing is provided with an inner sleeve 20' that is designed to slidably accept a hexagonal shaft 13A of the auger bit 13. which may be held at different elevations by a cross pin as seen in FIG. 6. Fixed to this inner sleeve 20' is a sprocket gear 22 and a shaft collar 23. The hexagonal shaft 13A is thus received in this assembly for rotative movement relative to the frame 12. At the lower end of the sleeve is a collar 24 that is suitably secured to the sleeve and is free from the channels 14 and 15. As the plate 16 is adjusted along the frame 12, each shaft 13A and its bearing goes with it. Additionally mounted on a top plate 16 are a pair of stud shafts 26, 27 that receive guide sprockets 28, 29 respectively. Passing around these sprockets is a drive chain 30 which, as will be seen by referring to FIG. 5, wraps the drive sprocket 22 by 180° by virtue of the idler sprockets 28 and 29 guiding the chain in this fashion. Each of the auger bits are mounted in exactly the same fashion on a plate 16 and therefore will not be described individualy except to say that in addition to the structure specifically mentioned a protective cover plate such as 33 is provided to prevent foreign objects from becoming entangled in the drive chain 30. The drive chain 30 proceeds around each of the auger bit assemblies in the fashion just described and thence around end idler sprockets 31, 32 (FIG. 2) and also around a drive sprocket 34 being guided there around by a pair of idler sprockets 35, 36. Power from a power take-off shaft of the tractor may be supplied over a drive means indicated generally at 37 which in the present instance connects with a shaft 38 and a pair of beveled gears that drive shaft attached to the sprocket 34. This particular detail is something that can be readily worked out by any mechanic and is therefore not shown or described in detail.

Additionally affixed to the frame 12 are feet which serve two basic functions. These feet take the form of a threaded rod 40 that is received in threaded apertures in the end plates 17 and 18 and has at one end thereof a handle 41 and at the lower end a flange foot 42. Three such feet are provided as will be seen by referring to FIG. 2, being a foot at either end of the frame 12 and one substantially midway thereof and offset from the general longitudinal axis thereof. These feet serve to limit the vertical movement of the frame relative to the ground by stopping the penetration of each of the auger bits and when further extended, than shown in the drawing, will serve as mounting feet so that the frame may be placed on the floor of a barn or other structure for housing the frame permitting it to maintain its normal attitude with respect to the tractor and thus be readily attached thereto.

To support this frame including all the parts described above on the vehicle, which in the instant case is a tractor, there are provided two substantially parallel arms designated 50 and 51 (see FIG. 3). The arm 50 is suitably pivoted to the underbody of the tractor by suitable adapter plates and brackets as is the end of the bar 51. Both of these arms are of substantially equal length and are pivoted to the tractor frame on parallel axes which are in substantially vertical alignment. For example, to pivot the arm 50 to the tractor the end thereof may be bifurcated as at 53 and pivot on a pin 55 which is mounted longitudinally of the tractor. Similarly on another structure, vertically spaced from the pivot rod 55, the arm 51 may be pivoted such as on the shaft tube 57 of the power take-off, for example. It should be pointed out that any suitable means can be used to mount these arms 50 and 51 on the tractor, the main requirement being that two points should be selected vertically spaced from each other and in substantially vertical alignment. The other ends of the arms 50 and 51 are also pivoted to the frame 12 on points that are in substantially vertical alignment. To this end, the arm 50 is bifurcated as at 59 (FIG. 2) to form two legs 60 and 61. These legs are pivotally received on a shaft 62 which is mounted between spaced brackets 63, 64 that are bolted to the frame 12 as to the channel 14. Similarly between the plates 63, 64 and vertically spaced therefrom, another shaft 70 may be provided around which a collar 72 may extend that has welded thereto a bracket 73 that forms an attachment point for the end of the arm 51.

It should be appreciated that with this arrangement of the arms 50 and 51 in which they are pivoted in a vertical alignment at both ends that no matter what angular attitude they take with respect to the tractor, the frame 12 will always remain in the same attitude. Thus, if the arms are initially adjusted so that the auger bit 13 is in a vertical position, it will remain in this vertical position throughout the movement of the arms 50 and 51 in angular relationship relative to the tractor. It is essential, therefore, that means be provided for adjusting the length of the arms 50 and 51. To that end, the arm 50 is generally provided of a fixed length, being made up of a middle arm section and two bifurcated ends. However, the arm 51 is made adjustable, and to this end is provided with a left and right hand threaded coupling such as at 75 which will adjust the length of the arm relative to its support as is well known to those versed in the art. Thus, once the pivoting points are selected on the tractor, the mechanism may be adjusted for the particular tractor in use and then need never be adjusted again until it is changed to a different tractor.

It is generally desirable that the entire assembly including the arms 50 and 51 be made removable from the tractor so that other attachments can be used thereon, and for this purpose I preferably receive the shaft 55 in a pair of bearings 56 so that the shaft 55 may be held in position by a pair of cotter pins 56′ or the like and easily knocked out so that the arm 50 can be detached from the tractor frame. Similarly, the arm 51 can be readily detached from the tractor frame since its pin 58 extends through a bifurcated end and an extension on the propeller casing and can be readily driven therefrom by a wooden mallet. Thus, in the fashion shown, the entire frame assembly can be readily removed from the tractor and will rest on the feet 42 that have been provided for that purpose.

To raise and lower the entire frame, the arm 50 is suitably coupled to a hydraulic means that is normally supplied with the tractor. For illustrative purposes I have shown a chain 80 extending from a fastening band 82 on the arm 50 and thence to a rocking arm 84 which arm is coupled to the normal lifting mechanism provided with this tractor that is illustrated. This lifting mechanism is normally used in connection with snow plows, rotary mowing devices and the like, and has sufficient power to lift the frame 12. Alternately, of course, other lifting means may be utilized, it being preferred to have hydraulic means which of course could be directly connected to the upper arm 50 rather than through the chain shown in the illustration. Other minor modifications will, of course, suggest themselves to those skilled in the art.

In operation of this instant device as attached to the tractor, let us assume that we are desiring to dig a plurality of holes to transplant nursery seedlings. Let us first assume that the operator of the machine has just finished making four holes with the four auger bits shown on the frame 12, as illustrated in the drawing. He then elevates the entire frame 12 through hydraulic means and drives the tractor in a straight line forward until his sight bar 100 (see FIG. 1) is lined up with the last hole. At this point it should be explained that the sight bar 100 is adjusted so that the pointer end thereof points to the last hole that has just been dug, and in this position will give the proper spacing from the last hole to the first of the next group of holes that will be dug. To this end, therefore, the longitudinal spacing of the end of the pointer 102 to the first auger bit 13 will be the same as the spacing between the individual auger bits 13 mounted on the frame 12. Having assumed the proper longitudinal position in the row, the operator then lowers the auger bits which are always rotating due to the fact that he has engaged the clutch for the power take-off. The auger bits then proceed in the ground until the feet 42 engage the ground. At this point the operator can raise the entire frame 12 through the hydraulic means and proceed on to the next group of holes to be dug and so forth until the entire row has been so formed to give a plurality of holes dug to an even depth in a straight line. As can be appreciated, this operation is extremely fast and leaves a nice ragged hole with dirt piled up around the periphery of the hole so that a nursery transplant may be easily placed therein, the foot being used to push the earth back around the roots of the transplant and then immediately proceeding on to the next hole, thus facilitating a rather fast operation.

I claim:

1. The combination with a tractor having a lifting hoist and a driving means, a longitudinal frame, a pair of arms pivotally mounted on the frame and tractor in parallel spaced relation, said arms being of approximate equal length and having their pivot points on the tractor in substantial vertical alignment, a coupling between one of said arms and the lifting hoist of the tractor, a plurality of auger assemblies carried by said frame, each assembly comprising a bearing and a sleeve rotatably mounted therein, means mounting said bearing on said frame for selectively positioning said bearing along said frame, an auger bit received in each sleeve, means coupling said driving means to each said sleeve for rotating the same, and at least three adjustable feet carried by said frame, said feet being arranged so that at least one is offset with respect to the frame whereby as a unit the frame may be supported by said feet.

2. A combination as in claim 1 wherein the means coupling said driving means includes a driving sprocket rotatably mounted on said frame and coupled to said driving means, sprockets fastened to the sleeves, two idler sprockets mounted in spaced relation on opposite sides of the rotative axis of each sleeve sprocket and a chain in engagement with each of the said sprockets to secure a maximum wrap of chain about each of said sleeve sprockets.

3. A combination as in claim 1 wherein the auger bit has a shank received in said sleeve for sliding axial movement whereby the axial position of the bit relative to the sleeve may be varied.

4. A combination as in claim 1 wherein the said feet include threaded shafts received in threaded holes on the frame whereby the frame may be threadingly jacked into position relative to the tractor.

References Cited in the file of this patent

UNITED STATES PATENTS

| | | | |
|---|---|---|---|
| 2,067,781 | Mueller | Jan. 12, | 1937 |
| 2,410,508 | Lamme | Nov. 5, | 1946 |
| 2,414,072 | Taft | Jan. 7, | 1947 |
| 2,635,855 | Gunning | Apr. 21, | 1953 |
| 2,806,324 | Ruth et al. | Sept. 17, | 1957 |
| 2,918,130 | Thom | Dec. 22, | 1959 |